US008786705B2

(12) United States Patent
Kister et al.

(10) Patent No.: US 8,786,705 B2
(45) Date of Patent: Jul. 22, 2014

(54) DATA TRANSMISSION SYSTEM

(75) Inventors: Andreas Kister, Lörrach (DE); Matthias Seifert, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 560 days.

(21) Appl. No.: 12/997,457

(22) PCT Filed: Jun. 3, 2009

(86) PCT No.: PCT/EP2009/056809
§ 371 (c)(1), (2), (4) Date: Dec. 10, 2010

(87) PCT Pub. No.: WO2009/150084
PCT Pub. Date: Dec. 17, 2009

(65) Prior Publication Data
US 2011/0085038 A1    Apr. 14, 2011

(30) Foreign Application Priority Data
Jun. 10, 2008 (DE) .......................... 10 2008 028 020

(51) Int. Cl.
*H04N 13/00* (2006.01)
*B61B 1/02* (2006.01)
*B61L 23/00* (2006.01)
*B61L 3/12* (2006.01)

(52) U.S. Cl.
CPC . *B61L 23/00* (2013.01); *B61B 1/02* (2013.01); *B61L 3/125* (2013.01)
USPC .......................................................... 348/148

(58) Field of Classification Search
USPC .......................................................... 348/148
See application file for complete search history.

(56) References Cited

U.S. PATENT DOCUMENTS

| 1,376,849 A | | 5/1921 | Winter | |
| 3,961,323 A | * | 6/1976 | Hartkorn | 340/539.1 |
| 2004/0113783 A1 | * | 6/2004 | Yagesh | 340/568.1 |

(Continued)

FOREIGN PATENT DOCUMENTS

| EP | 0 890 496 A1 | 1/1999 |
| EP | 1 386 813 A1 | 2/2004 |

(Continued)

OTHER PUBLICATIONS

Feser, et al. "Sicherheit an der Bahnsteigkante/Safety at the edge of platform", Zevrail—Glasers Annalen, Nov. 2005, pp. 226-235, Georg Siemens Verlag, Berlin, Germany.

*Primary Examiner* — Dave Czekaj
*Assistant Examiner* — Md Haque
(74) *Attorney, Agent, or Firm* — Laurence A. Greenberg; Werner H. Stemer; Ralph E. Locher

(57) ABSTRACT

A data transmission system contains a transmitting and/or receiving unit on a track side and a transmitting and/or receiving unit on a vehicle side. Accordingly, the transmitting and/or receiving unit on the vehicle side contains at least one transmitting and/or receiving element on the vehicle side which is mounted in the region of a track vehicle door. The unit is covered by the track vehicle door and separated from the rail track when the track vehicle door is closed and remains uncovered by the same when the track vehicle door is open.

11 Claims, 8 Drawing Sheets

(56) References Cited

U.S. PATENT DOCUMENTS

| | | |
|---|---|---|
| 2004/0181321 A1* | 9/2004 | Fries et al. .................. 701/19 |
| 2009/0145325 A1 | 6/2009 | Bradley et al. |
| 2010/0176251 A1 | 7/2010 | Kister |

FOREIGN PATENT DOCUMENTS

| | | |
|---|---|---|
| EP | 1 759 954 A1 | 3/2007 |
| WO | 2007/107747 A1 | 9/2007 |
| WO | 2009/013167 A1 | 1/2009 |

* cited by examiner

DATA TRANSMISSION SYSTEM

BACKGROUND OF THE INVENTION

Field of the Invention

The invention relates to a data transmission system for data transmission between a rail vehicle and a trackside device, having the features according to the precharacterizing clause of claim 1.

By way of example, such data transmission systems are known from subway systems and suburban railroad systems. They have a trackside transmitting and/or receiving device and a vehicle-side transmitting and/or receiving device and are used to transmit data between the rail vehicle and the track. By way of example, video monitoring signals are transmitted from the rail vehicle to the track in order that it is possible to determine when a problem situation has arisen in the course of trackside monitoring of the rail vehicle. For example, on the track side, the police can be informed when the video data indicates that crimes have occurred within the rail vehicle. In addition, for example, the fire service can be informed if it is found that a fire has broken out within the rail vehicle.

BRIEF SUMMARY OF THE INVENTION

The invention is based on the object of specifying a data transmission system which allows particularly reliable transmission of data between the rail vehicle and the track and/or conversely from the track to the rail vehicle.

According to the invention, this object is achieved by a data transmission system having the features claimed in patent claim 1.

Advantageous refinements of the data transmission system according to the invention are specified in dependent claims.

The invention accordingly provides that the vehicle-side transmitting and/or receiving device has at least one vehicle-side transmitting and/or receiving element, which is fitted in the area of a rail vehicle door and covered by the rail vehicle door and is separated from the rail track when the door is in the closed state, and is not covered by the rail vehicle door when the rail vehicle door is open.

One major advantage of the data transmission system according to the invention is that it prevents the data traffic between the rail vehicle and the track from being endangered by dirt on the transmitting and/or receiving element on the rail vehicle side. Because the rail vehicle door covers the vehicle-side transmitting and/or receiving element, according to the invention, this ensures that the transmitting and/or receiving element cannot become dirty while the rail vehicle is traveling. The vehicle-side transmitting and/or receiving element is exposed, and can be used for transmitting and receiving, only when the rail vehicle is stationary and the rail vehicle door is opened. The risk of becoming dirty is considerably reduced when the rail vehicle is stationary, as a result of which failure of the data transmission because of dirt is considerably less probable than in the case of conventional data transmission systems, in which the vehicle-side transmitting and/or receiving elements are always exposed to the rail track.

In order to prevent sensors from becoming dirty, it is analogously considered to be advantageous for at least one trackside transmitting and/or receiving element of a trackside transmitting and/or receiving device to be arranged in the area of a platform protection door such that it is covered by the platform protection door, and is separated from the rail track, when the platform protection door is closed, and remains uncovered by the platform protection door when the platform protection door is open.

The trackside transmitting and/or receiving element and the vehicle-side transmitting and/or receiving element are preferably arranged such that, when the rail vehicle door is positioned in front of the platform protection door, data transmission is possible between the two transmitting and/or receiving elements. For example, the trackside transmitting and/or receiving element and the vehicle-side transmitting and/or receiving element are arranged such that the two transmitting and/or receiving elements are opposite one another when the rail vehicle door is positioned in front of the platform protection door.

In order to allow as high a data transmission rate as possible, it is considered to be advantageous for the vehicle-side and the trackside transmitting and/or receiving device each to have at least two or more transmitting and/or receiving elements, and for these to be operated in parallel.

The vehicle-side and the trackside transmitting and/or receiving device preferably each have at least two or more transmitting and/or receiving elements, which are arranged such that they are opposite in pairs when the rail vehicle door is positioned in front of the platform protection door.

Furthermore, the invention relates to a rail vehicle having a vehicle-side transmitting and/or receiving device.

In a rail vehicle such as this, to prevent reliable data transmission between the rail vehicle and the track from being prevented or at least being made more difficult by dirt effects, the invention provides that the vehicle-side transmitting and/or receiving device has at least one vehicle-side transmitting and/or receiving element which is fitted in the area of a rail vehicle door and covered by the rail vehicle door, and is separated from the rail track, when the rail vehicle door is closed, and remains uncovered by the rail vehicle door when the latter is open.

Advantageous refinements of the rail vehicle according to the invention are specified in dependent claims. For the advantages of the rail vehicle according to the invention, reference should be made to the above statements relating to the data transmission system according to the invention.

In order to allow video monitoring of the rail vehicle, it is considered to be advantageous for the rail vehicle to have a video monitoring system which is connected to the vehicle-side transmitting and/or receiving device, produces video data and temporarily stores this video data and for the vehicle-side transmitting and/or receiving device to be designed such that, when stopped at a platform, it transmits the temporarily stored video data to a trackside transmitting and/or receiving device.

Furthermore, the invention relates to an arrangement having at least one trackside transmitting and/or receiving device and having at least one platform protection door.

In an arrangement such as this, in order to prevent dirt from adversely affecting the transmission quality when data is transmitted between a rail vehicle and the track, or vice versa, the invention provides that the trackside transmitting and/or receiving device has at least one trackside transmitting and/or receiving element which is arranged relative to the platform protection door such that it is covered by the platform protection door and is separated from the rail track when the platform protection door is closed, and remains uncovered by the platform protection door when the platform protection door is open.

For the advantages of the arrangement according to the invention, reference should be made to the above statements relating to the data transmission system according to the invention. Advantageous refinements of the arrangement according to the invention are specified in dependent claims.

Furthermore, the invention relates to a method for transmitting data from a rail vehicle to a trackside device, and vice versa.

In order to achieve a method such as this, in which the transmitting and/or receiving elements which are used for transmission and/or reception may become dirty more slowly than in the past, the invention provides that the rail vehicle is stopped at a platform such that at least one rail vehicle door is located in front of a platform protection door, at least one vehicle-side transmitting and/or receiving element, which is covered by the rail vehicle door when the latter is closed, is exposed by opening the rail vehicle door, at least one trackside transmitting and/or receiving element which is covered by the platform protection door when the latter is closed is exposed by opening the platform protection door, and data is transmitted unidirectionally or bidirectionally between the two exposed transmitting and/or receiving elements.

For the advantages of the method according to the invention, reference should be made to the above statements relating to the data transmission system according to the invention, since the advantages essentially correspond to one another.

Video data which is temporarily stored in the rail vehicle during the course of the method is preferably transmitted from the vehicle-side transmitting and/or receiving element to the trackside transmitting and/or receiving element.

The invention will be explained in more detail in the following text with reference to exemplary embodiments; in this case, by way of example:

DESCRIPTION OF THE INVENTION

For the sake of clarity, the same reference symbols are always used for identical or comparable components in the figures.

Figure 1:
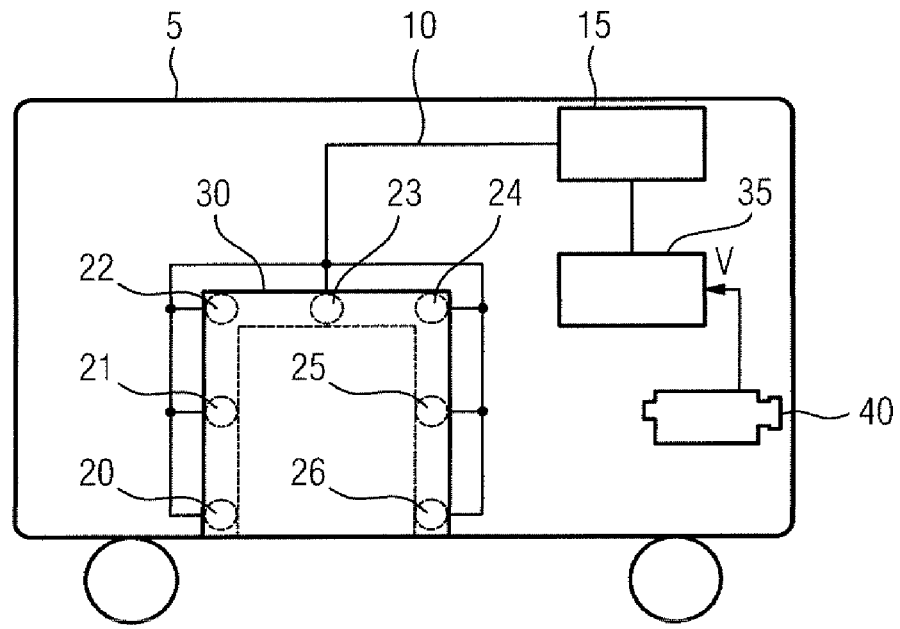
FIG. 1 shows one exemplary embodiment of a rail vehicle according to the invention, whose rail vehicle door is closed.

FIG. 1 shows a rail vehicle 5 which is equipped with a vehicle-side transmitting and/or receiving device 10. The vehicle-side transmitting and/or receiving device 10 has a vehicle-side control device 15 and vehicle-side transmitting and/or receiving elements 20 to 26, which are arranged in the area of a rail vehicle door 30 of the rail vehicle 5.

The arrangement of the vehicle-side transmitting and/or receiving elements 20 to 26 is chosen such that they are covered by the rail vehicle door 30 when the latter is closed. FIG. 1 shows the rail vehicle door 30 closed, as a result of which the vehicle-side transmitting and/or receiving elements 20 to 26 are covered, and are separated from the rail track; in order to illustrate this in a drawing, the vehicle-side transmitting and/or receiving elements 20 to 26 have been represented by dashed lines.

The rail vehicle door 30 therefore protects the vehicle-side transmitting and/or receiving elements 20 to 26 against dirt which originates from the rail track. For example, when the rail vehicle 5 is travelling, dirt and dust can swirl up from the rail track, and could contaminate the vehicle-side transmitting and/or receiving elements 20 to 26. However, the rail vehicle door 30 prevents this, because it provides a covering from the rail track.

A video monitoring system 35, which is connected to a camera 40, is connected to the vehicle-side control device 15 for the vehicle-side transmitting and/or receiving device 10. Video data V from the camera 40 is temporarily stored by the video monitoring system 35, and is transmitted via the vehicle-side transmitting and/or receiving device 10 to a trackside transmitting and/or receiving device. This will be explained in more detail further below in conjunction with FIGS. 7 to 9.

Figure 2:
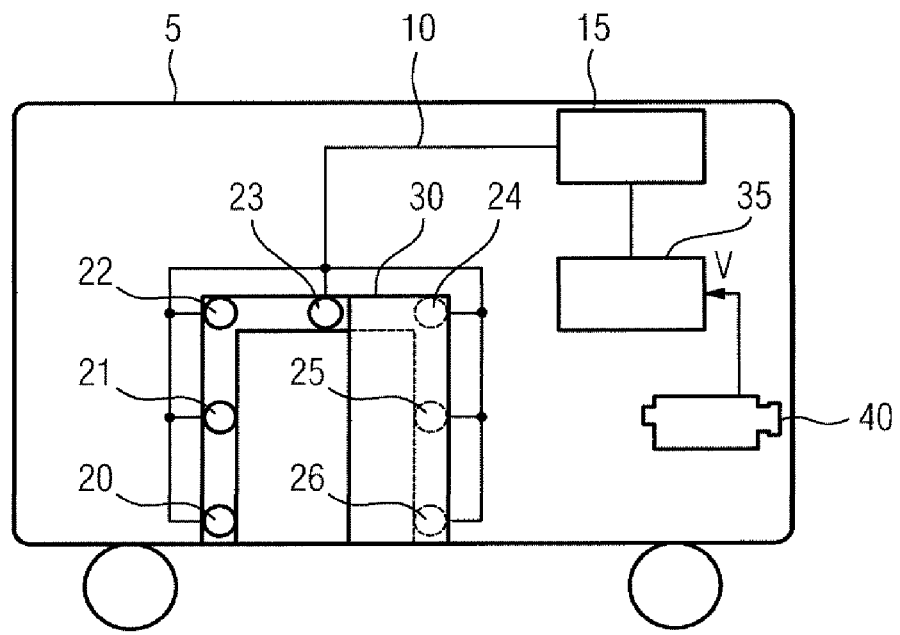
FIG. 2 shows the rail vehicle as shown in FIG. 1 with the rail vehicle door half open.

FIG. 2 shows the rail vehicle 10 as shown in FIG. 1, after the rail vehicle door 30 has been approximately ⅔ opened. As can be seen, the vehicle-side transmitting and/or receiving elements 20, 21, 22 and 23 are now no longer covered by the rail vehicle door 30. These transmitting and/or receiving elements 20 to 23 are accordingly now represented by solid lines, and no longer by dashed lines. The vehicle-side transmitting and/or receiving elements 24 to 26, in contrast, are still covered by the rail vehicle door 30, as a result of which they are still denoted by dashed lines.

Figure 3:
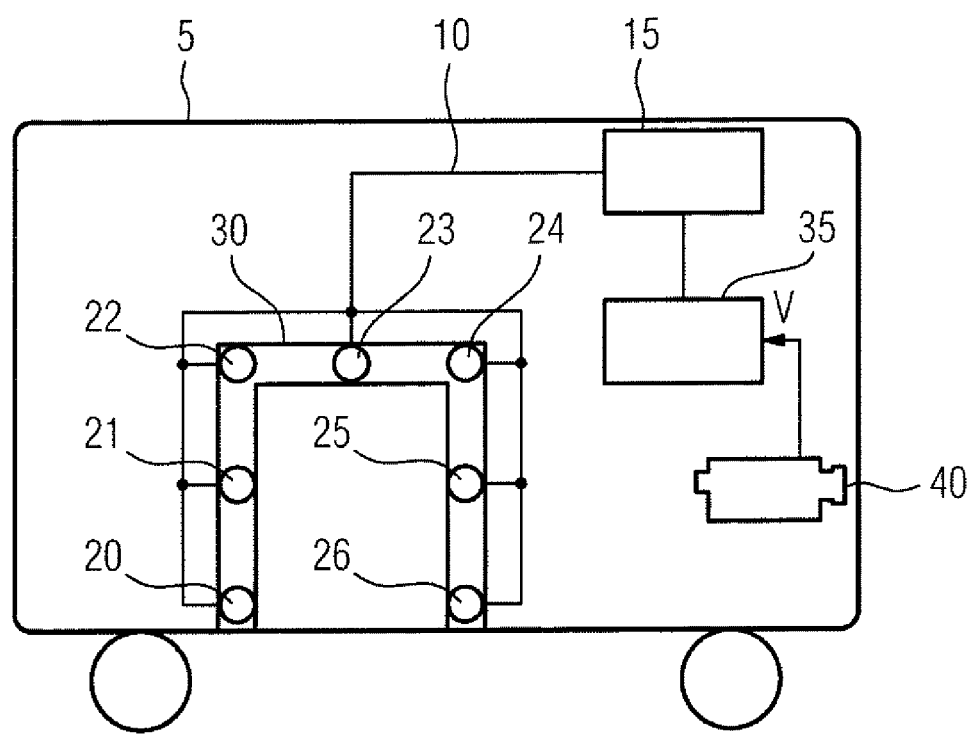
FIG. 3 shows the rail vehicle as shown in FIG. 1 with the rail vehicle door open.

FIG. 3 shows the rail vehicle 5 as shown in FIG. 1 after the rail vehicle door 30 has been completely opened. As can be seen, all seven vehicle-side transmitting and/or receiving elements 20 to 26 are now exposed, and can be seen. They are now accordingly denoted by solid lines.

Figure 4:
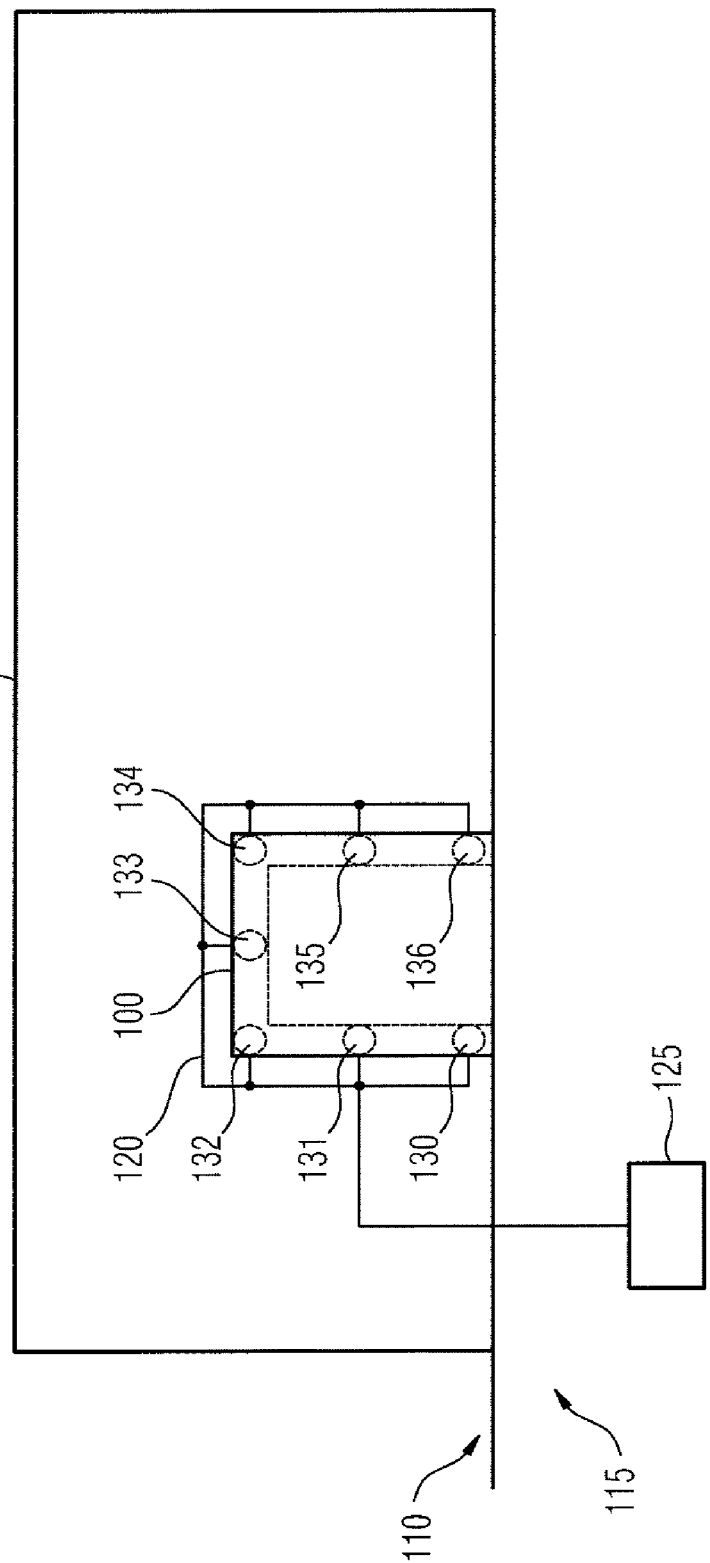
FIG. 4 shows one exemplary embodiment of an arrangement having a platform protection door and having a trackside transmitting and/or receiving device, in which, in the illustration shown in FIG. 4, the platform protection door is closed.

FIG. 4 shows one exemplary embodiment of the arrangement having a platform protection door 100. The platform protection door 100 is part of a platform protection wall 105 which physically separates the rail track 110 from the platform area 115 in a station, which is not shown in any more detail, such that the passengers cannot fall onto the rail track 110 from the platform area 115. The platform protection door 100 is preferably always closed, except when a rail vehicle is positioned in front of the platform protection door 100 such that the passengers can enter the rail vehicle from the platform area 115, and can exit from the rail vehicle. The platform protection door 100 is therefore preferably opened only for entering into rail vehicles or for exiting from rail vehicles.

Furthermore, FIG. 4 shows a trackside transmitting and/or receiving device 120 which comprises a trackside control device 125 as well as trackside transmitting and/or receiving elements 130 to 136.

The trackside transmitting and/or receiving elements 130 to 136 are arranged in the area of the platform protection door 100 such that they are covered by the platform protection door 100 and are separated from the rail track 110 when the platform protection door 100 is closed. The platform protection door 100 therefore protects the trackside transmitting and/or receiving elements 130 to 136 against dirt originating from the rail track 110. For example, when rail vehicles are entering and leaving the station, dust and dirt can swirl up from the rail track 110 and could contaminate the trackside transmitting and/or receiving elements 130 to 136. However, this is prevented by the platform protection door 100, since it provides a covering from the rail track 110.

In the illustration shown in FIG. 4, the platform protection door 100 is closed, as a result of which the trackside transmitting and/or receiving elements 130 to 136 are covered; they are accordingly represented only by dashed lines.

Figure 5:
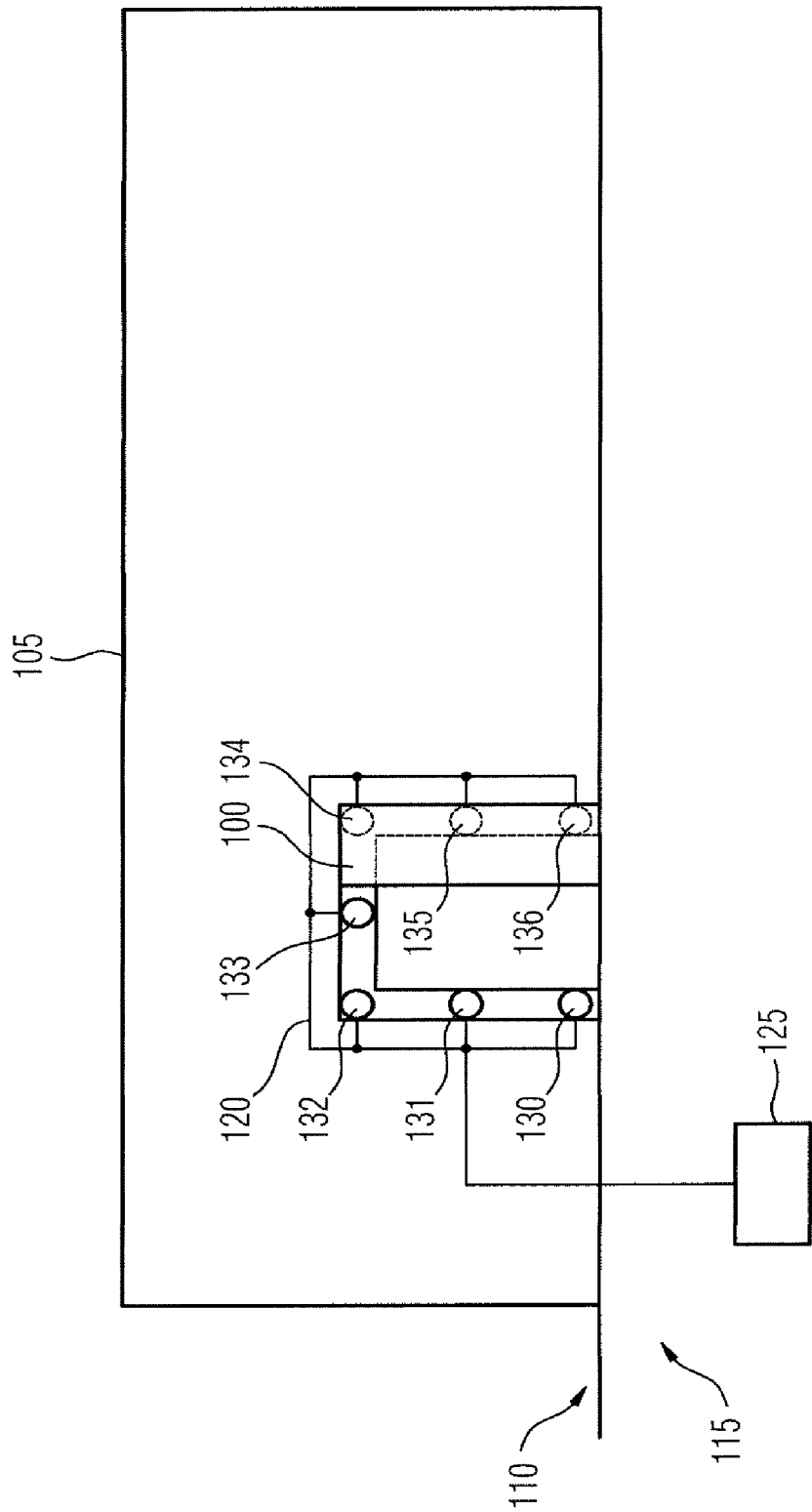
FIG. 5 shows the arrangement as shown in FIG. 4 with the platform protection door half open.

FIG. 5 shows the platform protection door after it has been about two-thirds opened. As can be seen, the transmitting and/or receiving elements 130 to 133 are now no longer covered by the platform protection door 100; they are accordingly now denoted by solid lines. The transmitting and/or receiving elements 134 to 136 are still covered by the platform protection door 100 when the latter is in this position, as a result of which they are denoted by dashed lines.

Figure 6:
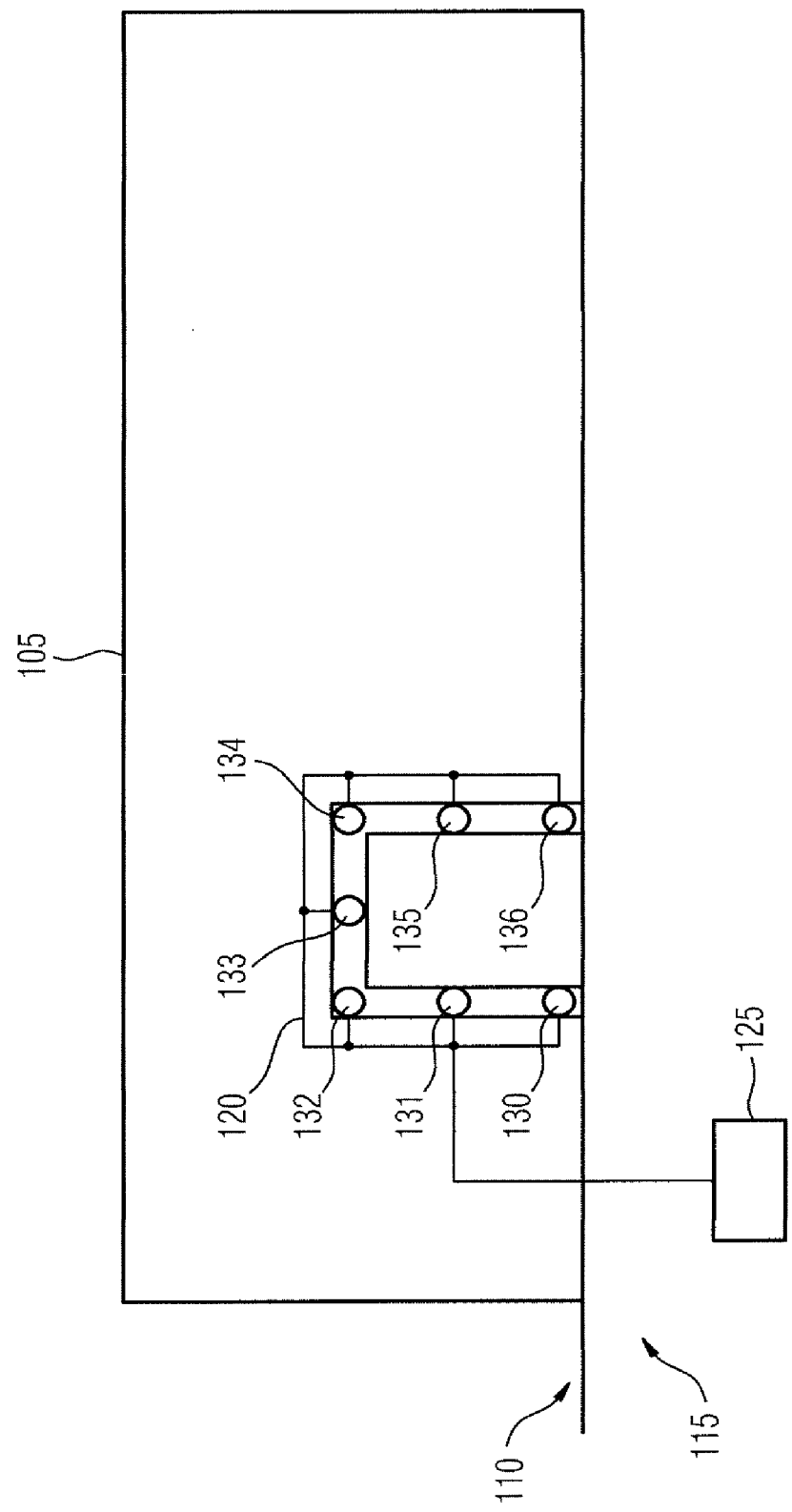
FIG. 6 shows the arrangement as shown in FIG. 4 with the platform protection door open.

In the illustration shown in FIG. 6, the platform protection door 100 has been completely opened. As can be seen, the trackside transmitting and/or receiving elements 130 to 136 are now completely exposed, and are available and ready for transmission and/or reception with vehicle-side transmitting and/or receiving elements.

Figure 7:
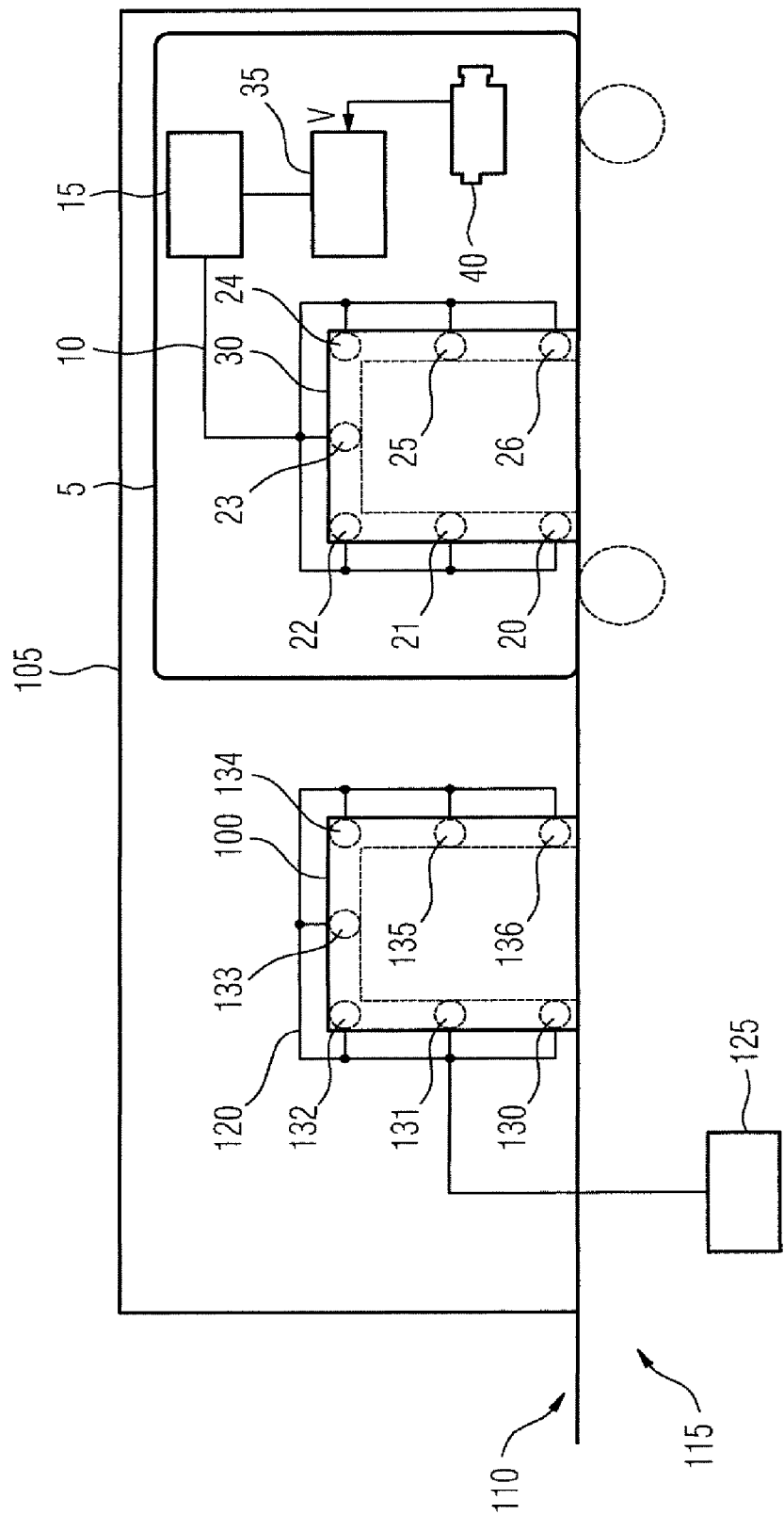
FIG. 7 shows one exemplary embodiment of a data transmission system according to the invention, having a rail vehicle which is entering a train station area.

FIG. 7 shows one exemplary embodiment of a data transmission system, which comprises a vehicle-side transmitting and/or receiving device 10 as well as a trackside transmitting and/or receiving device 120. In the illustration shown in FIG. 7, the rail vehicle 5 is entering a station area, in which case both the rail vehicle door 30 and the platform protection door 100 are still closed. The vehicle-side transmitting and/or receiving elements 20 to 26 are accordingly still covered by the rail vehicle door 30; in a corresponding manner, the platform protection door 100 covers the trackside transmitting and/or receiving elements 130 to 136.

Figure 8:
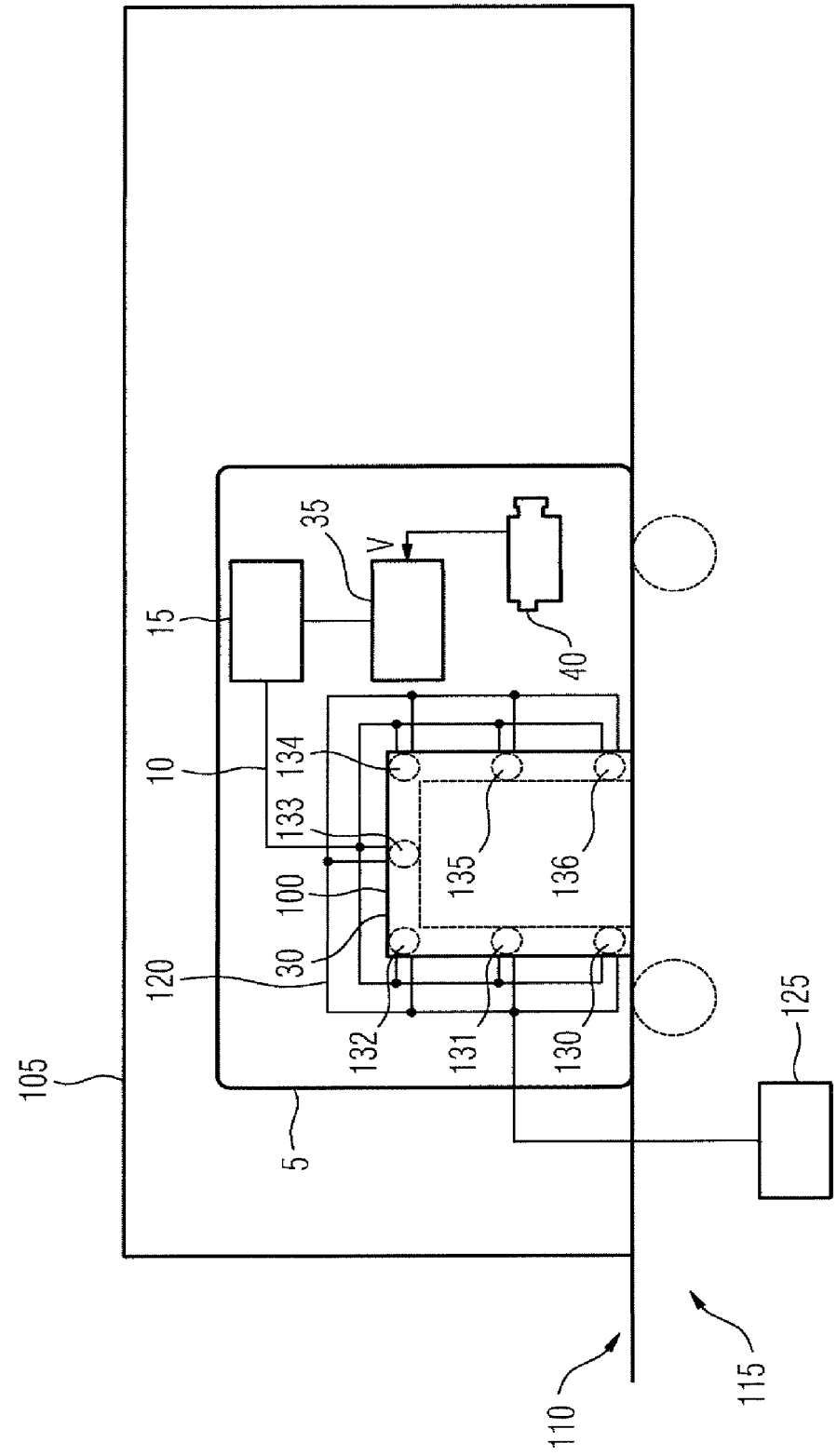
FIG. 8 shows a data transmission system as shown in FIG. 7, in which the rail vehicle has stopped in front of a platform protection door.

In the illustration shown in FIG. 8, the rail vehicle 5 is positioned in front of the platform protection wall 105 such that the rail vehicle door 30 is positioned behind the platform protection door 100. The positioning is preferably chosen such that the vehicle-side transmitting and/or receiving elements 20 to 26 and the trackside transmitting and/or receiving elements 130 to 136 are opposite one another in pairs. In the illustration shown in FIG. 8, the platform protection door 100 and the rail vehicle door 30 are still closed.

Once the rail vehicle 5 has come to rest, the platform protection door 100 and the rail vehicle door 30 are opened, as a result of which the trackside transmitting and/or receiving elements as well as the vehicle-side transmitting and/or receiving elements are exposed and are opposite one another in pairs, such that unidirectional or bidirectional data transmission is now possible.

Figure 9:
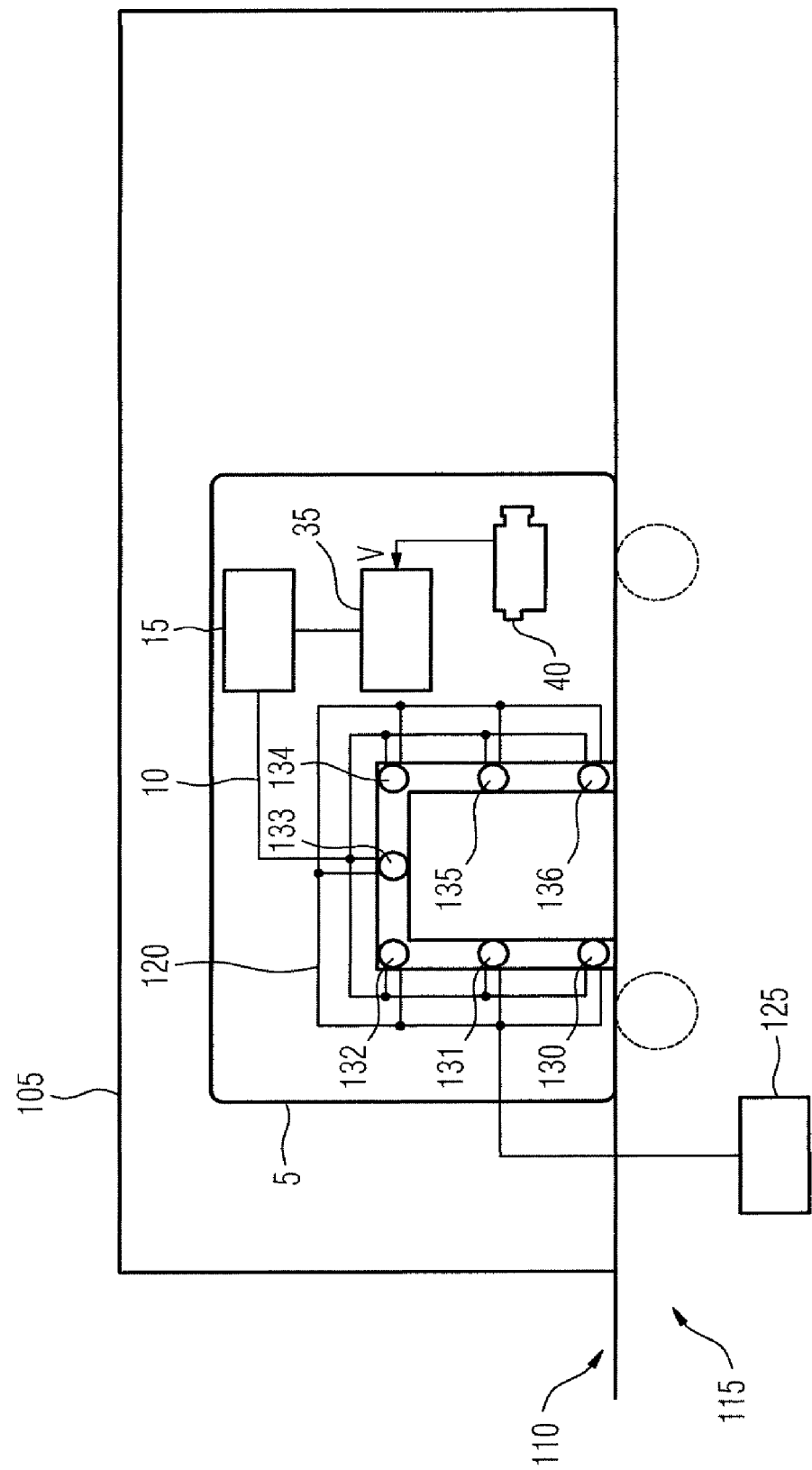
FIG. 9 shows the rail vehicle in front of the platform protection door with the doors open.

The data transmission system shown in FIGS. 7 to 9 may be operated, for example, by using the camera 40 in the rail vehicle 5 to record video data V while the rail vehicle is moving, with this video data V relating to the vehicle interior of the rail vehicle 5 or to the track on which the rail vehicle 5 is moving. The video data V is transmitted to the video monitoring system 35 and is temporarily stored there until the rail vehicle 5 has entered the respective next station area and data transmission is possible with the trackside transmitting and/or receiving device 120 there.

As soon as the rail vehicle 5 has been positioned in front of the platform protection door 100 and the rail vehicle door 30 and the platform protection door 100 have been opened, the video monitoring system 35 starts to transmit the temporarily stored video data V via the vehicle-side control device 15 and the vehicle-side transmitting and/or receiving elements 20 to 26 to the trackside transmitting and/or receiving elements 130 to 136, and therefore, in consequence, to the trackside transmitting and/or receiving device 120.

In order to achieve a high data transmission rate, the video data V is preferably transmitted in parallel form, with the data being split between the total of seven transmitting and/or receiving elements 20 to 26 and 130 to 136, respectively, which are opposite one another in pairs, and being transmitted via the respectively associated transmitting and/or receiving element pairs.

By way of example, the transmitting and/or receiving elements 20 to 26 and 130 to 136, respectively, may be elements which can transmit and/or receive electromagnetic radiation. For example, infrared radiation or radar radiation is transmitted between the transmitting and/or receiving elements, for data transmission.

The invention claimed is:

1. A data transmission system, comprising:
a trackside transmitting and/or receiving device located at a platform; and
a vehicle-side transmitting and/or receiving device having at least one vehicle-side transmitting and/or receiving element fitted in an area of a rail vehicle door of a rail-vehicle, said vehicle-side transmitting and/or receiving device covered by the rail vehicle door when the door is in a closed state, and said vehicle-side transmitting and/or receiving device not covered by the rail vehicle door when the rail vehicle door is open to enable communication between said vehicle-side transmitting and/or receiving device and said trackside transmitting and/or receiving device only when the rail-vehicle is stopped at the platform.

2. The transmission system according to claim 1, wherein said trackside transmitting and/or receiving device has at least one trackside transmitting and/or receiving element disposed in an area of a platform protection door such that said at least one trackside transmitting and/or receiving element is covered by the platform protection door, and is separated from the rail track, when the platform protection door is closed, and remains uncovered from the platform protection door when the platform protection door is open.

3. The data transmission system according to claim 2, wherein said trackside transmitting and/or receiving element and said vehicle-side transmitting and/or receiving element are disposed such that, when the rail vehicle door is positioned in front of the platform protection door, data transmission is possible between said trackside transmitting and/or receiving element and said vehicle-side transmitting and/or receiving element.

4. The data transmission system according to claim 2, wherein said trackside transmitting and/or receiving element and said vehicle-side transmitting and/or receiving element are disposed such that said trackside transmitting and/or receiving element and said vehicle-side transmitting and/or receiving element are opposite one another when the rail vehicle door is positioned in front of the platform protection door.

5. The data transmission system according to claim 1, wherein said vehicle-side transmitting and/or receiving device and said trackside transmitting and/or receiving device each have at least two transmitting and/or receiving elements which are operated in parallel.

6. The data transmission system according to claim 1, wherein said vehicle-side transmitting and/or receiving device and said trackside transmitting and/or receiving device each have at least two transmitting and/or receiving elements, which are disposed such that they are opposite in pairs when the rail vehicle door is positioned in front of a platform protection door.

7. A rail vehicle, comprising:
a rail vehicle door of a rail-vehicle; and
a vehicle-side transmitter and/or receiving device having at least one vehicle-side transmitting and/or receiving element fitted in an area of said rail vehicle door of the rail-vehicle, said vehicle-side transmitting and/or receiving device covered by said rail vehicle door when said rail vehicle door is closed, said vehicle-side transmitting and/or receiving device uncovered by said rail vehicle door when said rail vehicle door is open to enable communication with said vehicle-side transmitting and/or receiving device only when the rail-vehicle is stopped at a platform.

8. The rail vehicle according to claim 7,
further comprising a video monitoring system connected to said vehicle-side transmitting and/or receiving device, said video monitoring system producing video data and temporarily storing the video data; and
wherein said vehicle-side transmitting and/or receiving device configured such that, when stopped at a platform, said vehicle-side transmitting and/or receiving device transmits the temporarily stored video data to a trackside transmitting and/or receiving device.

9. A configuration, comprising:
at least one platform protection door located at a platform; and
at least one trackside transmitting and/or receiving device having at least one trackside transmitting and/or receiving element disposed relative to said platform protection door such that said at least one trackside transmitting and/or receiving element is covered by said platform protection door when said platform protection door is closed, said trackside transmitting and/or receiving device uncovered by said platform protection door when the platform protection door is open to enable communication with said trackside transmitting and/or receiving device only when a rail-vehicle is stopped at the platform.

10. A method for transmitting data from a rail vehicle to a trackside device and/or vice versa, which comprises the steps of:
stopping the rail vehicle at a platform such that at least one rail vehicle door is disposed in front of a platform protection door located at the platform;
exposing at least one vehicle-side transmitting and/or receiving element, which is covered by the rail vehicle door when the rail vehicle door is closed, by opening the rail vehicle door;
exposing at least one trackside transmitting and/or receiving element, which is covered by the platform protection door when the rail vehicle door is closed, by opening the platform protection door; and
transmitting the data unidirectionally or bidirectionally between the two exposed transmitting and/or receiving elements only when the rail-vehicle is stopped at the platform.

11. The method according to claim 10, which further comprises transmitting, video data produced and temporarily stored in the rail vehicle, from the vehicle-side transmitting and/or receiving element to the trackside transmitting and/or receiving element.

* * * * *